United States Patent [19]
Siefert et al.

[11] Patent Number: 5,401,420
[45] Date of Patent: Mar. 28, 1995

[54] SULFIDE ION-SELECTIVE ELECTRODES FOR CONTROL OF CHEMICAL FEED OF ORGANIC SULFIDE PRODUCTS FOR METAL ION PRECIPITATION FROM WASTE WATER

[75] Inventors: Kristine S. Siefert, Crete; Pek L. Choo, Naperville; Wayne M. Carlson, Batavia, all of Ill.

[73] Assignee: Nalco Chemical Company, Naperville, Ill.

[21] Appl. No.: 216,372

[22] Filed: Mar. 23, 1994

Related U.S. Application Data

[63] Continuation of Ser. No. 27,692, Mar. 8, 1993, Pat. No. 5,328,599.

[51] Int. Cl.[6] .................................................. C02F 1/62
[52] U.S. Cl. ..................................... 210/709; 210/725; 210/727; 210/912; 210/743; 210/746
[58] Field of Search ............... 210/709, 724, 725, 726, 210/727, 743, 746, 912–914, 143

[56] References Cited

U.S. PATENT DOCUMENTS

| | | | |
|---|---|---|---|
| 4,329,224 | 5/1982 | Kim | 210/709 |
| 4,465,593 | 8/1984 | Wemhoff | 210/96.1 |
| 4,724,084 | 2/1988 | Pahmeier et al. | 210/709 |
| 4,943,377 | 7/1990 | Legare | 210/709 |
| 5,106,508 | 4/1992 | Schwitzgebel | 210/712 |
| 5,328,599 | 7/1994 | Siefert et al. | 210/96.1 |

*Primary Examiner*—Peter A. Hruskoci
*Attorney, Agent, or Firm*—Robert A. Miller; James J. Drake

[57] ABSTRACT

A wastewater treatment system and method for chemical precipitation and removal of metals from wastewater in a continuous or batch treatment process includes an ion-selective sulfide electrode and a reference electrode disposed in a precipitation tank for measuring an electrochemical potential therebetween in a predetermined range. A controller unit is provided which is responsive to the electrochemical potential in the predetermined range and is connected to a precipitant feed unit for automatically controlling the chemical precipitant fed into the precipitation tank.

3 Claims, 3 Drawing Sheets

- □ - S=VALUE, mV
- ♦ - Cu LEVEL, ppm

- □ - Cu LEVEL, ppm
- ♦ - S=VALUES, mV

SULFIDE ION-SELECTIVE ELECTRODES FOR CONTROL OF CHEMICAL FEED OF ORGANIC SULFIDE PRODUCTS FOR METAL ION PRECIPITATION FROM WASTE WATER

This application is a division of application Ser. No. 08/027,692, filed Mar. 8, 1993, now U.S. Pat. No. 5,328,599.

BACKGROUND OF THE INVENTION

1. Field of the Invention

This invention relates generally to apparatus for removal of metals from wastewater, and more particularly, it relates to an improved wastewater treatment system and method for automatically controlling of chemical feed of organic sulfide products in wastewater containing metal ions so as to produce metal ion precipitation and removal of metals by sedimentation.

2. Description of the Prior Art

As is generally known, Oxidation-Reduction Potential electrodes are currently used to automate chemical feed control in continuous metal ion precipitation processes using alkyl dithiocarbamate (DTC), precipitant, or other organic sulfides. While Oxidation-Reduction Potential electrodes have been shown to respond to the presence of metal ions such as Cu(II), this electrode also responds to a myriad of electrochemically-active components that may be present in such wastewater, thus the electrode is non-specific. In the presence of an interference such as bleach, for instance, the Oxidation-Reduction Potential electrode is an unreliable sensor for precipitant feed control.

The only known literature or patent reference that describes a process that could be considered to slightly or remotely resemble that of the present invention, is U.S. Pat. No. 4,465,963 to M. F. Wemhoff. The disclosure of the Wemhoff patent is directed toward a system for the removal of metals from wastewater by chemical precipitation and filtration.

In the Wemhoff patent, the system 10 in FIG. 1 includes a holding tank 12 for storing untreated wastewater, the wastewater having metals dissolved therein. The system 10 processes the wastewater in the holding tank 12 in a batch-wise operation. The system further includes a reaction tank 14 which is connected by a fill line 16 to the holding tank. The reaction tank also receives a precipitating reagent from a tank 54 and a pH balancing reagent from a tank 50. A filter means 24 is coupled to the outlet of the reaction tank to receive liquid and precipitated metals therefrom. A manifold 30 connected to the outlet of the filter means is coupled to the inlet of the reaction tank 14.

An ion specific electrode 34 is disposed in the manifold 30, which is responsive to the free ion content of the wastewater, and is utilized to determine when the precipitation process carried on in the reaction tank 14 has been completed. A pH specific electrode 36 is also disposed in the manifold 30, which is responsive to the pH of the wastewater, and is utilized to control the pH thereof so as to prevent generating of toxic gas. A first valve means 32 controls the flow of filtrate through the manifold 30. A second valve means 40 controls the flow of filtrate through a drain line 38 which receives the fully treated effluent.

A microprocessor controller 46 is responsive to the ion specific and pH specific electrodes 34 and 36 and controls both the first and second valve means 32 and 34. Initially, the controller 46 causes the second valve means 40 to be closed and the first valve means to be opened so as to permit recirculation of treated wastewater from the output of the filter means 24 through the manifold 30 to the reaction tank 14. When the free ion content of the treated wastewater changes to a predetermined value as determined by the ion specific electrode 34, the microprocessor controller 46 causes the first valve means 32 to close and the second valve means 40 to open allowing the flow of effluent from the filter means 24 to the drain line 38. If the holding tank is not empty, the system allows the next batch of wastewater to be treated to be passed into the reaction tank 14.

The system in the Wemhoff patent is thus responsive only to the presence of excess sulfide which does not always allow for accurate detection and resulting precipitant feed because such ion specific electrodes are known to plateau under precipitant overfeed conditions such that excess precipitant overfeed may occur without viable detection. Excess precipitant overfeed is a concern since dithiocarbamates are also biocides.

The present invention of a wastewater treatment system and method represents an improvement of the aforementioned '593 patent and includes a solid-state sulfide ion-selective electrode for monitoring a first setpoint value corresponding to a condition of precipitant underfeed and a second setpoint value corresponding to a condition of slight precipitant overfeed. The sulfide ion-selective electrode is responding to the metal ions in the wastewater during the underfeed condition and is responding to the slight excess of precipitant during the overfeed condition so as to cause an electrochemical potential (mV) between the sulfide electrode and a reference electrode.

SUMMARY OF THE INVENTION

Accordingly, it is a general object of the present invention to provide an improved wastewater treatment system and method for automatically controlling of chemical feed of organic sulfide products in wastewater containing metal ions so as to produce metal ion precipitation.

It is an object of the present invention to provide an improved system for chemical precipitation and removal of metals from wastewater in a continuous treatment process.

It is another object of the present invention to provide a system for chemical precipitation and removal of metals from wastewater in a batch treatment process.

It is still another object of the present invention to provide an improved system and method for chemical precipitation and removal of metals from wastewater which utilizes a solid-state sulfide ion-selective electrode for monitoring a first setpoint value corresponding to a condition of precipitant underfeed and a second setpoint value corresponding to a condition of slight precipitant overfeed.

It is still yet another object of the present invention to provide an improved system and method for chemical precipitation and removal of metals from wastewater which includes a sulfide electrode and a reference electrode disposed in a precipitation tank for measuring an electrochemical potential therebetween in a predetermined range and a controller unit responsive to the electrochemical potential for automatically controlling the chemical precipitant feed from a precipitant feed unit into the precipitation tank.

In accordance with these aims and objectives, the present invention is concerned with the provision of an improved system and method for chemical precipitation and removal of metals from wastewater in a continuous or batch treatment process which includes a sump for receiving wastewater from different streams containing dissolved metals therein. The sump has an inlet line and an outlet line. A neutralization tank has an inlet line coupled to the outlet line of the sump for receiving the wastewater. The neutralization tank has a pH monitor disposed therein and a control unit coupled to the pH monitor for controlling the pH of the wastewater. A precipitation tank has an inlet line coupled to an outlet line of the neutralization tank for receiving the wastewater having a controlled pH.

A precipitant feed unit is provided for feeding a chemical precipitant into the precipitation tank. A sulfide electrode and a reference electrode are also disposed in the precipitation tank for measuring an electrochemical potential therebetween in a predetermined range. A controller unit is responsive to the electrochemical potential in the predetermined range and is connected to the precipitant feed unit for automatically controlling the chemical precipitant fed into the precipitation tank.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
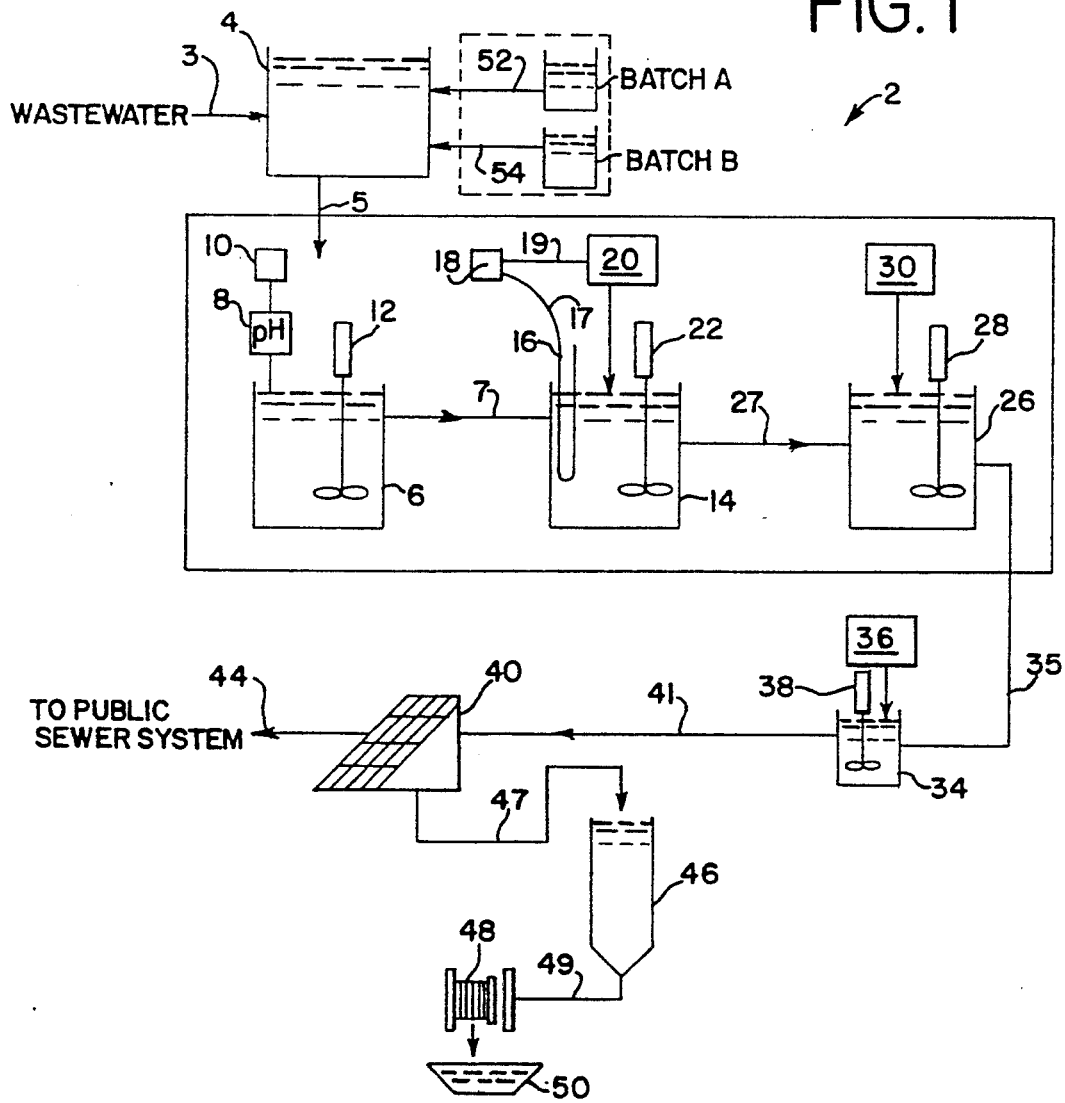
FIG. 1 is a schematic diagram of a system for chemical precipitation and removal of metals in a continuous treatment process, constructed in accordance with the principles of the present invention.

Referring now to the drawings, there is shown in FIG. 1 an improved wastewater treatment system 2 and method for removal for metal ions from wastewater, constructed in accordance with the principles of the present invention. The wastewater treatment system is used for automatically controlling of chemical feed of organic sulfide products in the wastewater so as to produce metal ion precipitation in a continuous treatment process. The system 2 includes a sump 4, where wastewater from different streams containing dissolved metals to be treated is pumped into it via an inlet line 3 on a continuous basis. The sump 4 allows for the combination of various streams.

The system also includes a neutralization tank 6 which is connected to the outlet line 5 of the equalization tank 4. A pH monitor 8 is disposed in the neutralization tank 6 and is attached to a control unit 10 for controlling the pH of the wastewater so as to avoid toxic gas. A variable speed mixer 12 is also included to provide for adequate mixing of the wastewater in the neutralization tank 6. The neutralization tank 6 allows for the control of the pH in the range of approximately 6–12. The pH is adjusted by addition of a basic solution or an acidic solution to maintain the appropriate pH depending on the specifics of the wastewater to be treated.

A precipitation tank 14 is connected to the neutralization tank 6 via a connection pipe 7 and includes an electrode 16 disposed therein which is a combination of a sulfide electrode and a reference electrode. Such an electrode can be an ISI model #M-12-S, or any other commonly known sulfide electrode. This electrode 16 is commonly 5.5" in length by 1.115" maximum outer diameter and has a range of 2 ppb to 35,000 ppm. Such an electrode 16 is relatively insensitive to sudden appearances of bleach and other contaminants. The electrode 16 is connected via lead line 17 to a controller unit 18. This controller unit 18 is commonly a JECO pH/mV microprocessor-based controller mounted in a NEMA 4 enclosure model #6300NP. The controller unit 18 has a range of $-9992$ mV to $+999$ mV. The controller unit 18 is connected to a precipitant feed unit 20 by means of a lead line 19. Commonly used precipitants include: dithiocarbamates (DTC), trimercaptotriazines (TMT), trithiocarbonates (TTC) and polymeric dithiocarbamates (pDTC).

Figure 2:
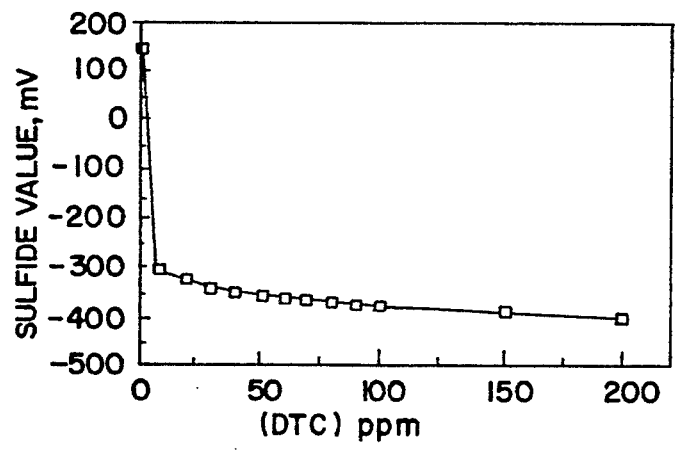
FIG. 2 is a graph of the electrochemical potential measured between a sulfide electrode and a reference electrode in the presence of dithiocarbamate.
Figure 3:
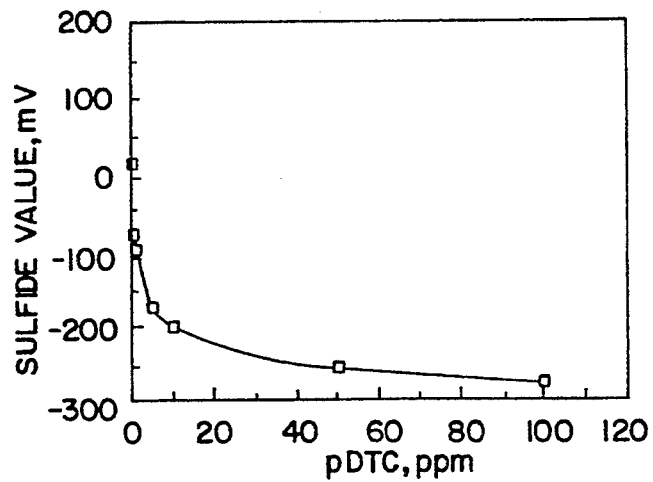
FIG. 3 is a graph of the electrochemical potential measured between a sulfide electrode and a reference electrode in the presence of polymeric dithiocarbamate.
Figure 4:
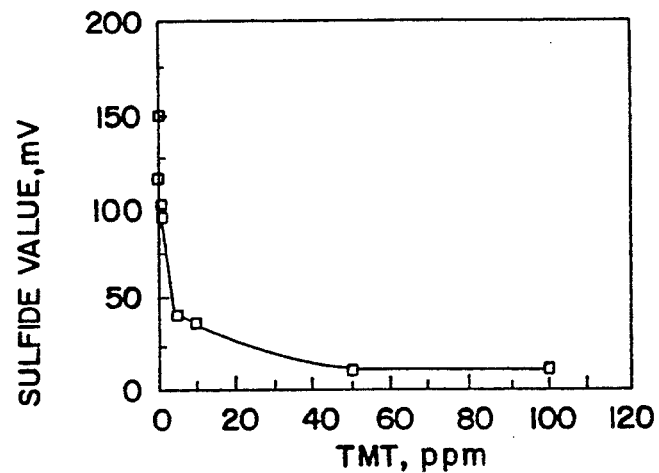
FIG. 4 is a graph of the electrochemical potential measured between a sulfide electrode and a reference electrode in the presence of trimercaptotriazine.
Figure 5:
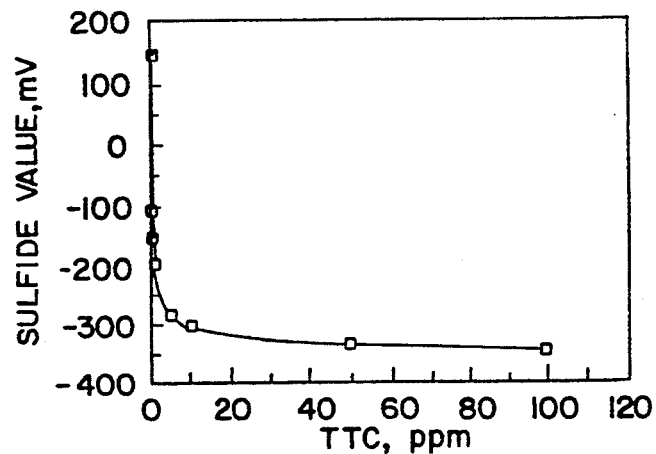
FIG. 5 is a graph of the electrochemical potential measured between a sulfide electrode and a reference electrode in the presence of trithiocarbonates.

In FIG. 2, there is shown a plot of the electrochemical potential (mY) measured between the sulfide electrodes and the reference electrode in the presence of increasing DTC precipitant dosage. In FIG. 3, there is illustrated a plot of the electrochemical potential (mV) measured between the sulfide electrode and the reference electrode in the presence of increasing pDTC precipitant dosage. In FIG. 4, there is shown a plot of the electrochemical potential (mV) measured between the sulfide electrode and the reference electrode in the presence of increasing TMT precipitant dosage. In FIG. 5, there is depicted a plot of the electrochemical potential (mV) measured between the sulfide electrode and the reference electrode in the presence of increasing TTC precipitant dosage.

Figure 6:
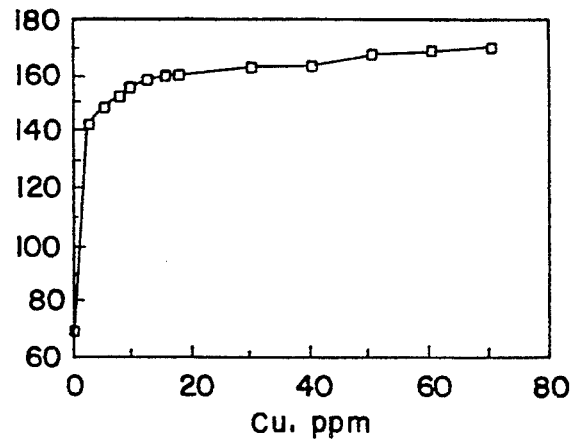
FIG. 6 is a graph of the electrochemical potential measured between a sulfide electrode and a reference electrode in the presence of increasing copper ions.

As can be seen from FIGS. 2 through 5, the electrochemical potential measured decreases as the various precipitant dosages are increased. In FIG. 6, there is shown a plot of the electrochemical potential (mV) measured between the sulfide electrode and the reference electrode in the presence of copper ions. It will be noted that the electrochemical potential increases with increasing copper concentration.

A variable speed mixer 22 is also disposed within the precipitation tank 14 to allow for proper mixing of the wastewater with any added precipitant. The sulfide ion-selective electrode 16 monitors both the concentrations of soluble, unreacted precipitant and metal ions. The complete reaction of precipitant and soluble metal ions in the wastewater result in the formation of an insoluble metal-precipitant complex. The presence of unreacted precipitant is due to both the incomplete reaction with metal ions in the wastewater and product overfeed. The presence of metal ions is due to precipitant underfeed.

The sulfide electrode responds to both the unreacted precipitant during the overfeed conditions and to the metal ions during the precipitant underfeed condition so as to cause an electrochemical potential (mV) between the sulfide electrode 16 and the reference electrode. The reference electrode is commonly a silver/silver sulfide electrode, but can be a mercury/mercury sulfide electrode which prevents fouling of the reference electrode in the presence of mercury in the wastewater. Wastewater usually remains in the precipitation tank 14 thirty minutes or more to insure complete reaction.

The system 2 also includes a coagulation tank 26 which is connected to the precipitation tank 14 via a connection pipe 27. The coagulation tank includes a variable speed mixer 28 and a coagulant feed unit 30. The coagulation tank 26 provides for charge neutralization of the precipitant-metal complex in the wastewater. Commonly, the precipitant-metal complex discharged from the precipitation tank 14 is negatively charged. The coagulant introduced into the system from 10 the coagulant feed unit 30 interacts with the precipitant-metal complex particles such that subsequent particle collisions result in formulation of larger floc particles which settle and aid in removal of the precipitant-metal complex. The coagulation tank 26 is well mixed by the speed mixer 28 to insure good dispersal of the coagulant and numerous particle collisions to cause particle growth. Wastewater commonly remains in the coagulation tank approximately 30 minutes or more.

A flocculation tank 34 is also included in the system 2 and is connected to the coagulation tank 26 via a connection pipe 35. A flocculant is added to the wastewater by a flocculant feed unit 36. The wastewater in the flocculation tank 34 is subjected to low-energy mixing by a variable speed mixer 38 to encourage further flocculation of the precipitated-metal complex. A clarifier 40, is connected to the flocculation tank 34 via a connection pipe 41. Floc settles in the clarifier 40 and clear effluent overflows a weir (not shown) at the top of the clarifier 40.

The clarifier 40 discharges the final effluent to a public municipal sewer at the outlet 44. One example of a sludge removal apparatus includes a cone-bottom tank 46 which is connected to the bottom of the clarifier 40 via a connection 47 for collection and thickening of sludge therefrom. A filter press 48 is connected via connection pipe 49 to the tank 46 to provide for further de-watering of the sludge. The dewatered sludge is periodically dropped into a hopper 50 and then sent to a sludge drier (not shown). The dried sludge is finally carried off to a landfill off-site.

In additional embodiments of the system 2 the neutralization tank 6, precipitation tank 14 and coagulation tank 26 can be combined into one or two tanks such that the pH of the wastewater is adjusted in the same tank where precipitation and/or coagulation is occurring. Further, the system 2 can be easily modified so as to remove metals from wastewater in a batch treatment process. This is achieved by replacing the inlet line 3 with separate containers such as Batch A and Batch B for supplying wastewater to be treated to the equalization tank 4 in a batch-wise operation via respective feed lines 52 and 54.

Figure 8:
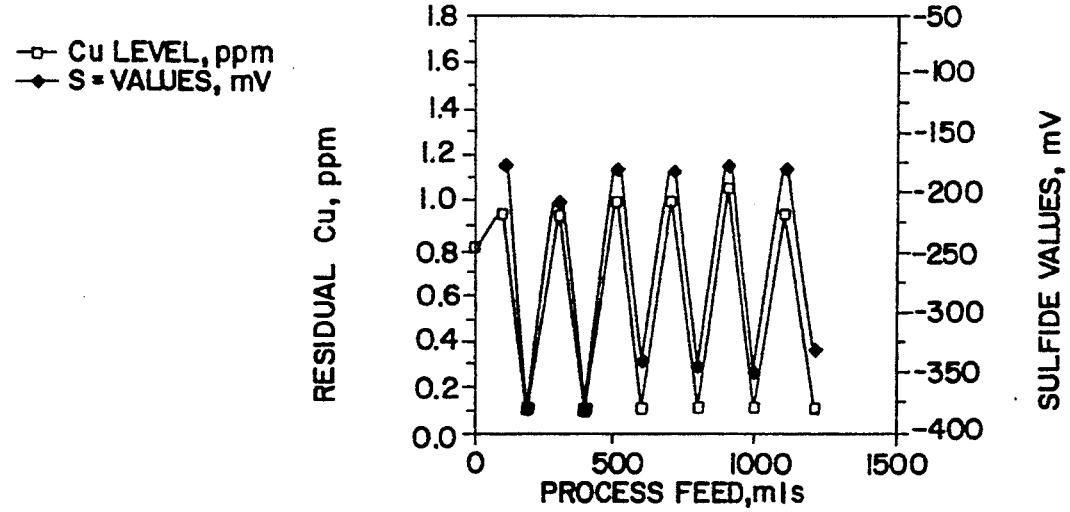
FIG. 8 is a graph of the electrochemical potential measured between a sulfide electrode and a reference electrode as copper ions are consumed by the precipitant (DTC) in a continuous treatment process.

The operation of the system 2 in FIG. 2 will now be explained for chemical precipitation and removal of metals from wastewater in a continuous treatment process with reference to FIG. 8 of the drawings. The wastewater is initially pumped through the inlet line 3 into the sump 4. The effluent from the sump 4 flows through the outlet line 5 and into the neutralization tank 6 where the pH monitor 8 determines the pH of the wastewater. The control unit 10 adds the required amount of base or acid to provide the appropriate pH depending on the specifics of the wastewater to be treated. The pH should be maintained in the range of approximately 6–12. The effluent from the neutralization tank 6 then flows through the connection pipe 7 and into the precipitation tank 14.

Prior to wastewater treatment, electrochemical potentials in a mV range are determined for proper operation of the controller unit 18. This mV range is determined experimentally based upon measuring of the metal concentration and/or the precipitant concentration at varying electrochemical potentials. This mV range is further based on the regulatory limits for various metal ions in the final effluent. The mV range corresponds to both metal ion concentrations below the regulatory limits and minimal levels of product overfeed.

In other words, a first setpoint value corresponding to a precipitant underfeed condition is used to define an upper end of the mV range. For example, in FIG. 8 a first setpoint value is approximately $-225$ mV where the copper ions is at 1.0 ppm which is assumed to be the metal ion concentration below the regulatory limit. A second setpoint value corresponding to a slight precipitant overfeed condition is used to define a lower end of the mV range. For example, in FIG. 8 again, a second setpoint value is approximately $-380$ mV where the copper ions is at 0.1 ppm. Thus, it can be seen that the setpoint values for the continuous treatment process were selected by relating the electrochemical potential (mV) to the corresponding residual copper values. Alternately, the second setpoint can be a lower value which will correlate to copper ions of 0 ppm and a slight overfeed of precipitant.

The controller unit 18 is programmed to output appropriate signals, corresponding to the first and second setpoint values, to the precipitant feed unit 20 via the lead line 19, such that the selected mV range is maintained by either turning on or off the precipitant feed unit 20 or by speeding the pumping rate of the unit 20 up or down. In particular, when the electrochemical potential as measured between the sulfide electrode and the reference electrode is above the first setpoint value, the controller unit 18 sends a first control signal to the feed unit 20 which is turned on or the pumping rate thereof is increased so as to add more precipitant into the precipitation tank 14. On the other hand, when the electrochemical potential drops below the second setpoint value the controller unit 18 sends a second control signal to the feed unit 20 which is turned off or the pumping rate thereof is decreased so as to decrease the amount of precipitant flowing into the precipitation tank. Accordingly, the appropriate precipitant dosage for the metal loading of the influent can be automatically controlled, despite changes in metal loading over time. In this manner, there is provided a tight precipitant dosage control depending on the metal concentration present in the influent so as to assure that no overfeed of precipitant occurs. Excess precipitant overfeed may cause unsafe conditions since dithiocarbamates are also biocides.

Since it is known that the sulfide electrode response to the precipitant including dithiocarbamate plateau under overfeed conditions, the process of the '593 patent being responsive to only the presence of excess sulfides may cause excessive overfeed without viable detection. The system 2 of the present invention solves this problem.

The effluent then flows from the precipitation tank 14 through the connection pipe 27 and to the coagulation tank 26 where charge neutralization of the precipitant-metal complex in the wastewater occurs. Such charge neutralization allows the coagulant introduced into the system to interact with the precipitant-metal complex particles such that the subsequent particle collisions result in the formulation of larger floc particles which settle and aid in the removal of the precipitant-metal complex. The effluent from the coagulation tank 26 then flows through the connection pipe 35 and into the flocculation tank 34 where the flocculant is added to the effluent by the flocculent feed unit 36. The flocculant provides bridging of the particles to form larger units which are easier to remove from the wastewater.

The effluent from the flocculation tank 34 then flows through the connection pipe 41 and into the clarifier 40 where floc settles onto inclined plates located in the clarifier and clear effluent over flows weir at the top of the clarifier. The clarifier 40 discharges the final effluent into the public sewer system. The sludge removed from the clarifier 40 is periodically blown down and pumped to the cone-bottom tank 46 for thickening. The thickened sludge is then pumped into the filter press 48 where further de-watering can occur. The dewatered sludge in the hopper 50 can then be dried and hauled away for appropriate disposal.

Figure 7:
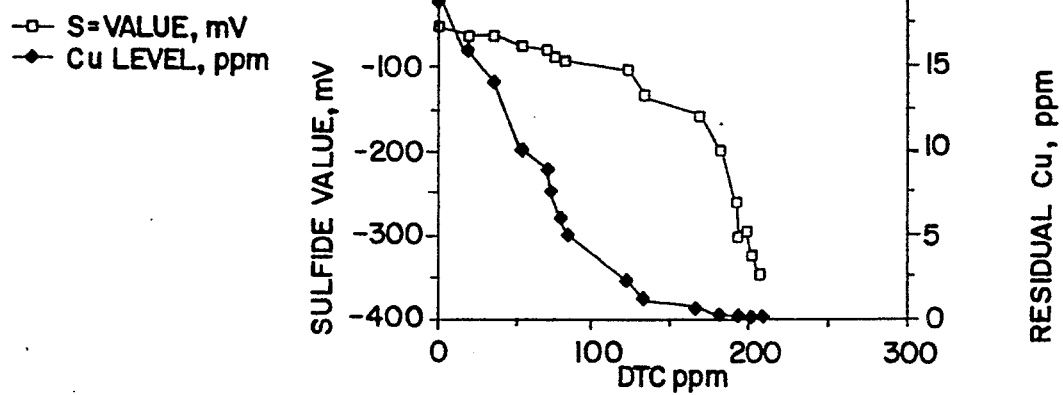
FIG. 7 is a graph of the electrochemical potential measured between a sulfide electrode and a reference electrode as copper ions are consumed by the precipitant (DTC) in a batch treatment process.

It should be understood by those skilled in the art that a similar operation can be described for chemical precipitation and removal of metals from wastewater in a batch treatment process. In FIG. 7, there is shown a graph, similar to FIG. 8, of the electrochemical potential measured between the sulfide electrode and the reference electrode as copper ions are consumed by the DTC precipitant in a batch treatment process. It will be noted that once the electrochemical potential drops below the setpoint value of approximately −360 mV the controller unit 18 will send a control signal to the precipitant feed unit 20 so as to turn off the same and the system is ready for the next batch of wastewater to be treated.

From the foregoing detailed description, it can thus be seen that the present invention provides an improved wastewater treatment system and apparatus for automatically controlling of chemical feed of organic sulfide products in wastewater containing metal ions so as to produce metal ion precipitation. The system of the present invention includes a sulfide electrode and a reference electrode disposed in a precipitation tank for measuring an electrochemical potential therebetween in a predetermined range. A controller unit is responsive to the electrochemical potential in the predetermined range and automatically controls the chemical precipitant feed from a precipitant feed unit into the precipitation tank.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A method of automatically controlling the chemical feed of an organic sulfide chemical precipitant to a wastewater treatment system, comprising the steps of:

continuously introducing a wastewater containing dissolved metal and having a pH in the range of about 6–12 into a precipitation tank;

continuously feeding an organic sulfide chemical precipitant by a precipitant feed unit into the precipitation tank in a sufficient amount to precipitate said dissolved metal;

determining a first set point electrochemical potential between a sulfide electrode and a reference electrode disposed in said precipitation tank corresponding to a precipitant underfeed condition and a second set point electrochemical potential between said sulfide electrode and the reference electrode corresponding to a precipitant overfeed condition programming a controller unit with said first setpoint electrochemical potential and said second setpoint electrochemical potential; and, automatically controlling the feed of said organic sulfide chemical precipitant by the precipitant feed unit into the precipitation tank by said controller unit which continuously maintains the electrochemical potential of the precipitation tank between the first set point and the second set point, to precipitate said dissolved metal in said precipitation tank.

2. A method as claimed in claim 1, further including the steps of generating a first control signal to said precipitant feed unit when the measured electrochemical potential is above the first setpoint for turning on or increasing the feed of said organic sulfide precipitant by said precipitant feed unit and generating a second control signal to said precipitant feed unit when the measured electrochemical potential is below the second setpoint for turning off or decreasing the feed of said organic sulfide precipitant by said precipitant feed unit.

3. A method as claimed in claim 2, wherein the organic sulfide is selected from the group consisting of dithiocarbamates, trimercaptotriazines, trithiocarbonates and polymeric dithiocarbamates.

* * * * *